J. D. COCKE.
SNOW REMOVING MACHINE.
APPLICATION FILED NOV. 5, 1920.
1,420,522.
Patented June 20, 1922.
6 SHEETS—SHEET 2.
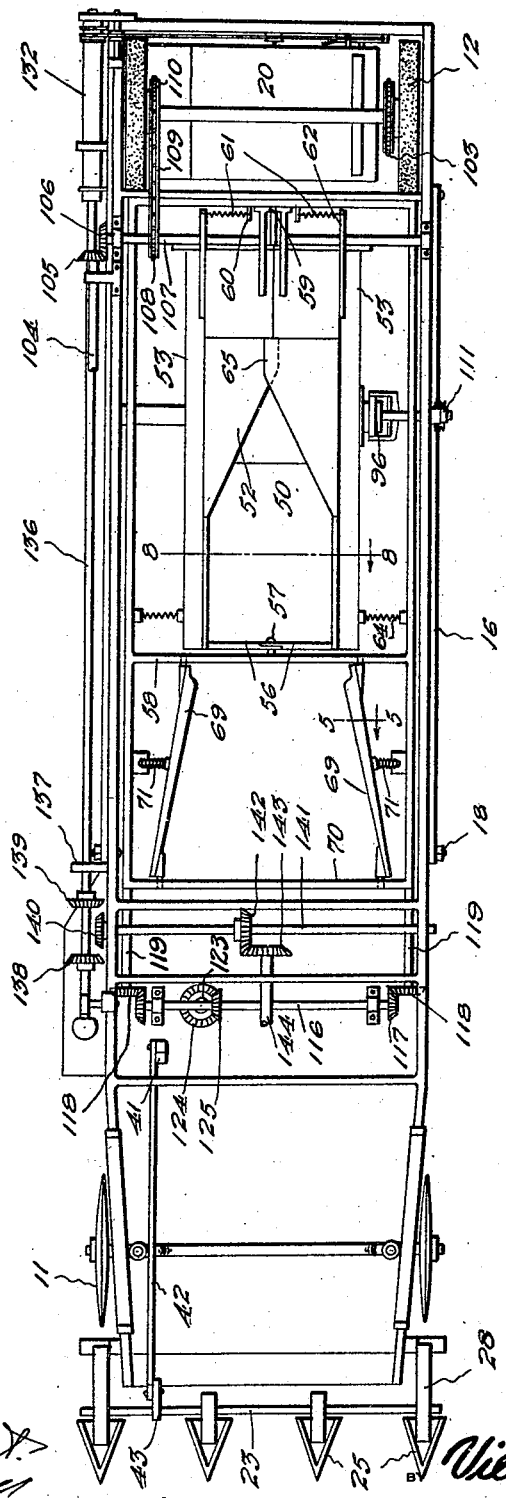
J. D. Cocke
INVENTOR J. D. COCKE.
SNOW REMOVING MACHINE.
APPLICATION FILED NOV. 5, 1920.
1,420,522. Patented June 20, 1922.
6 SHEETS—SHEET 3.
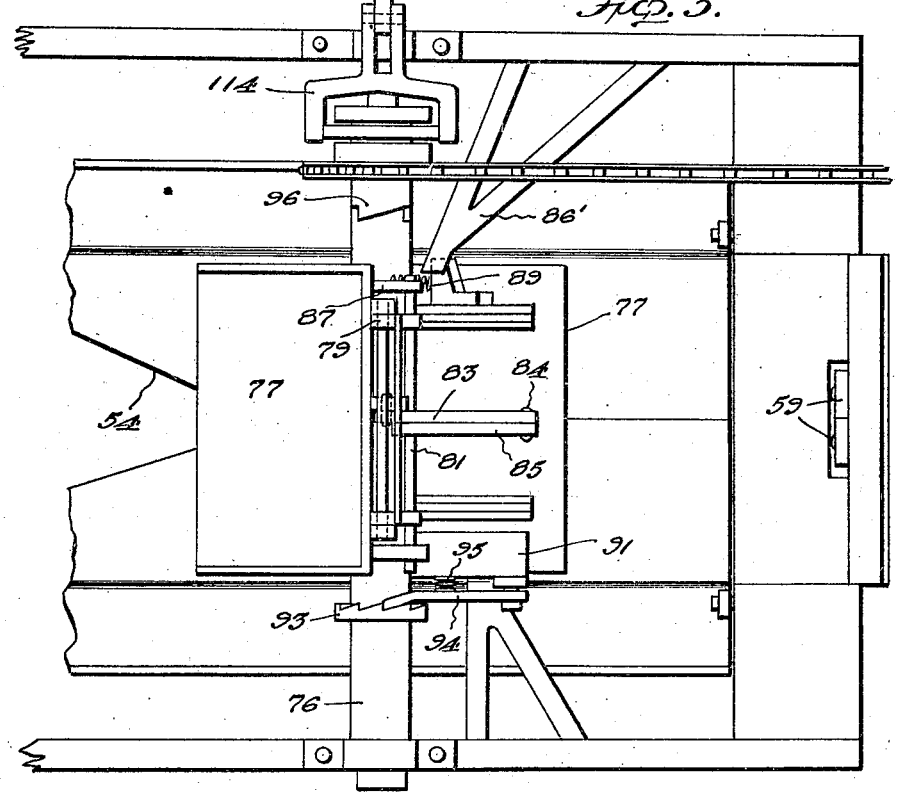
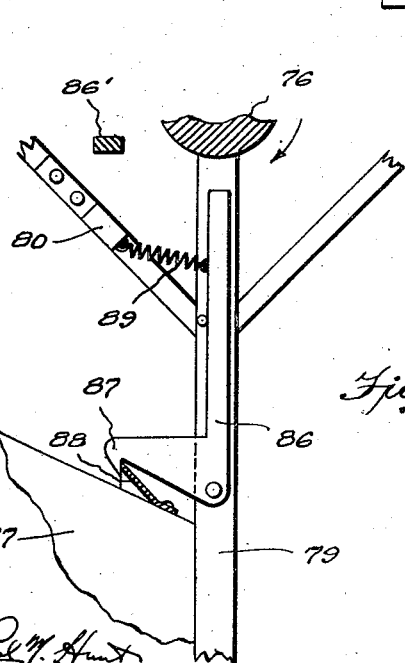
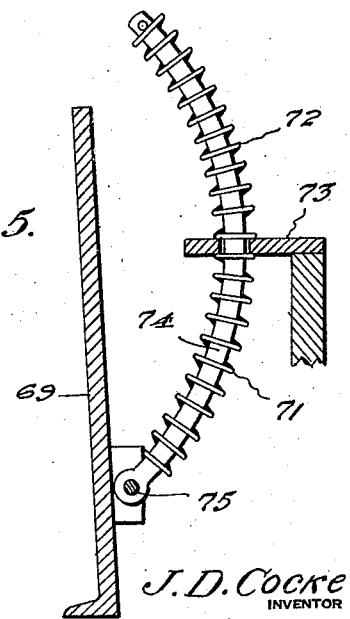
J. D. COCKE
INVENTOR
BY Victor J. Evans
ATTORNEY

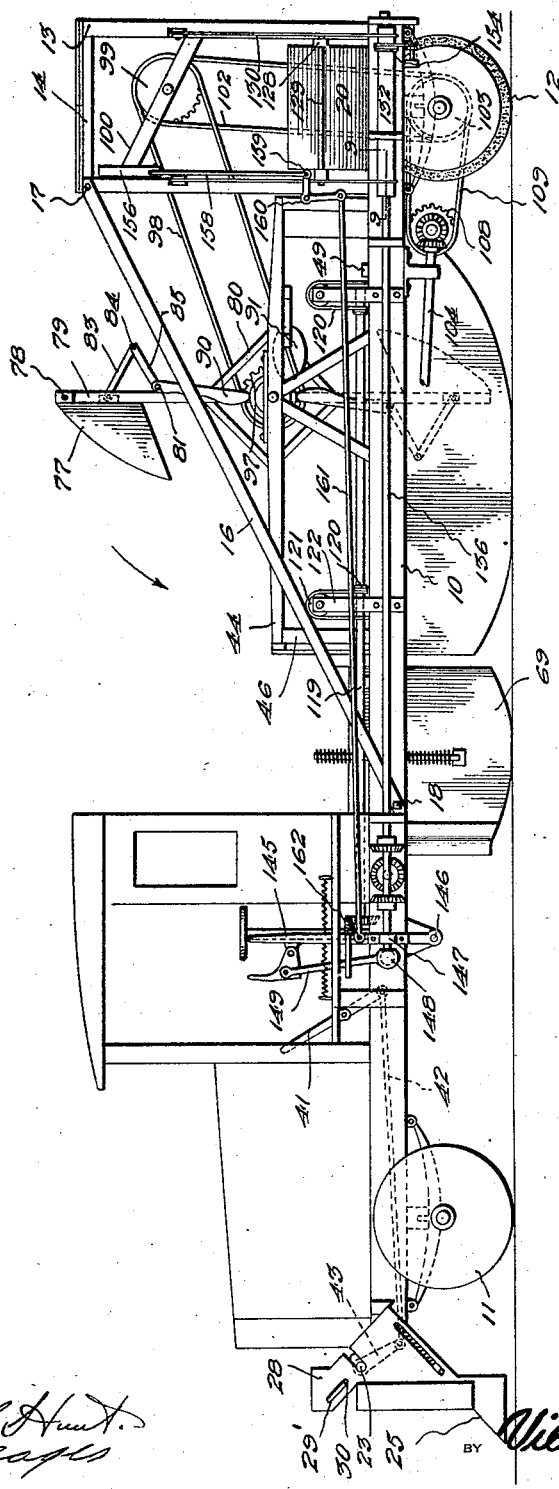

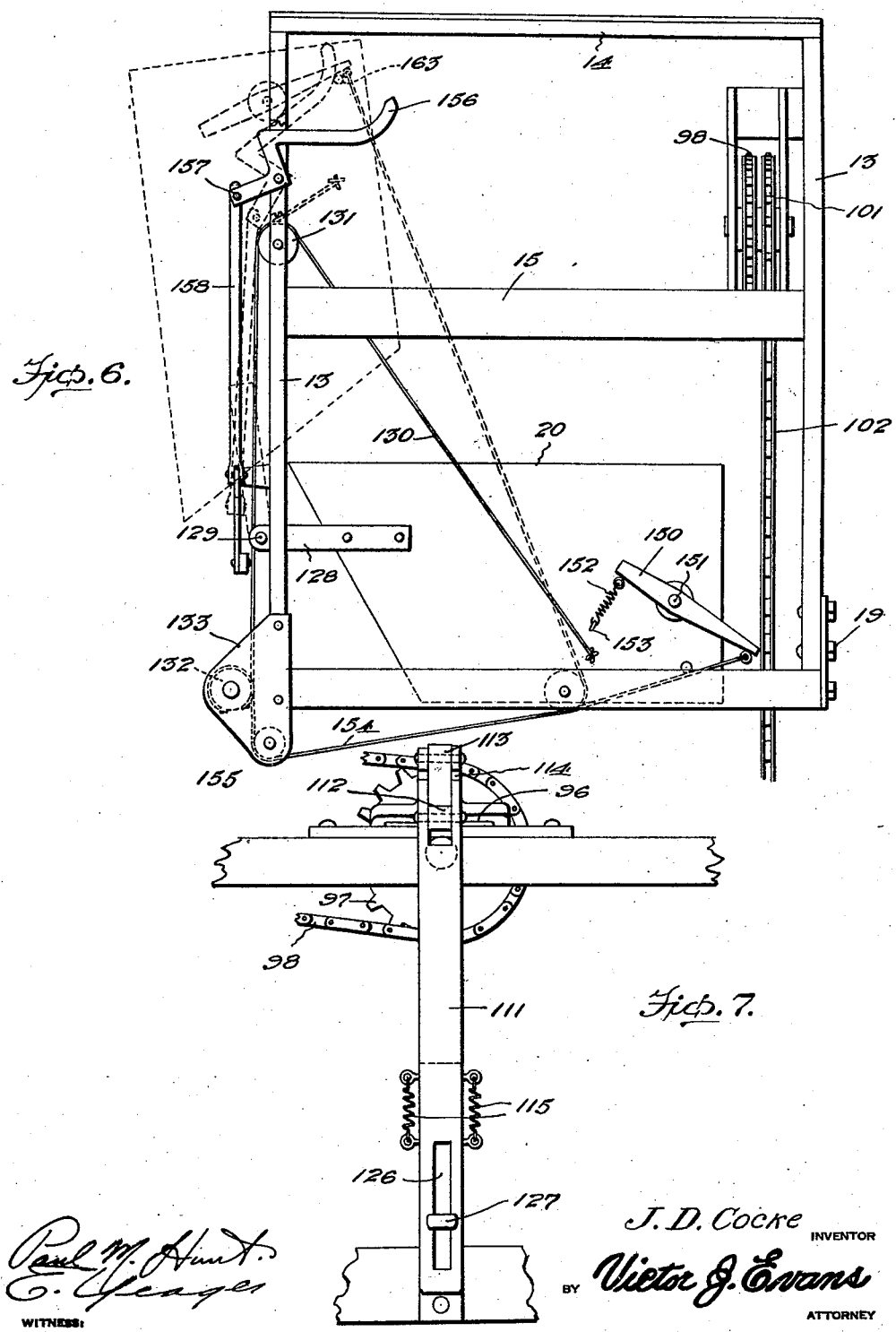

J. D. COCKE.
SNOW REMOVING MACHINE.
APPLICATION FILED NOV. 5, 1920.

1,420,522.

Patented June 20, 1922.
6 SHEETS—SHEET 5.

J. D. Cocke, INVENTOR

BY Victor J. Evans
ATTORNEY

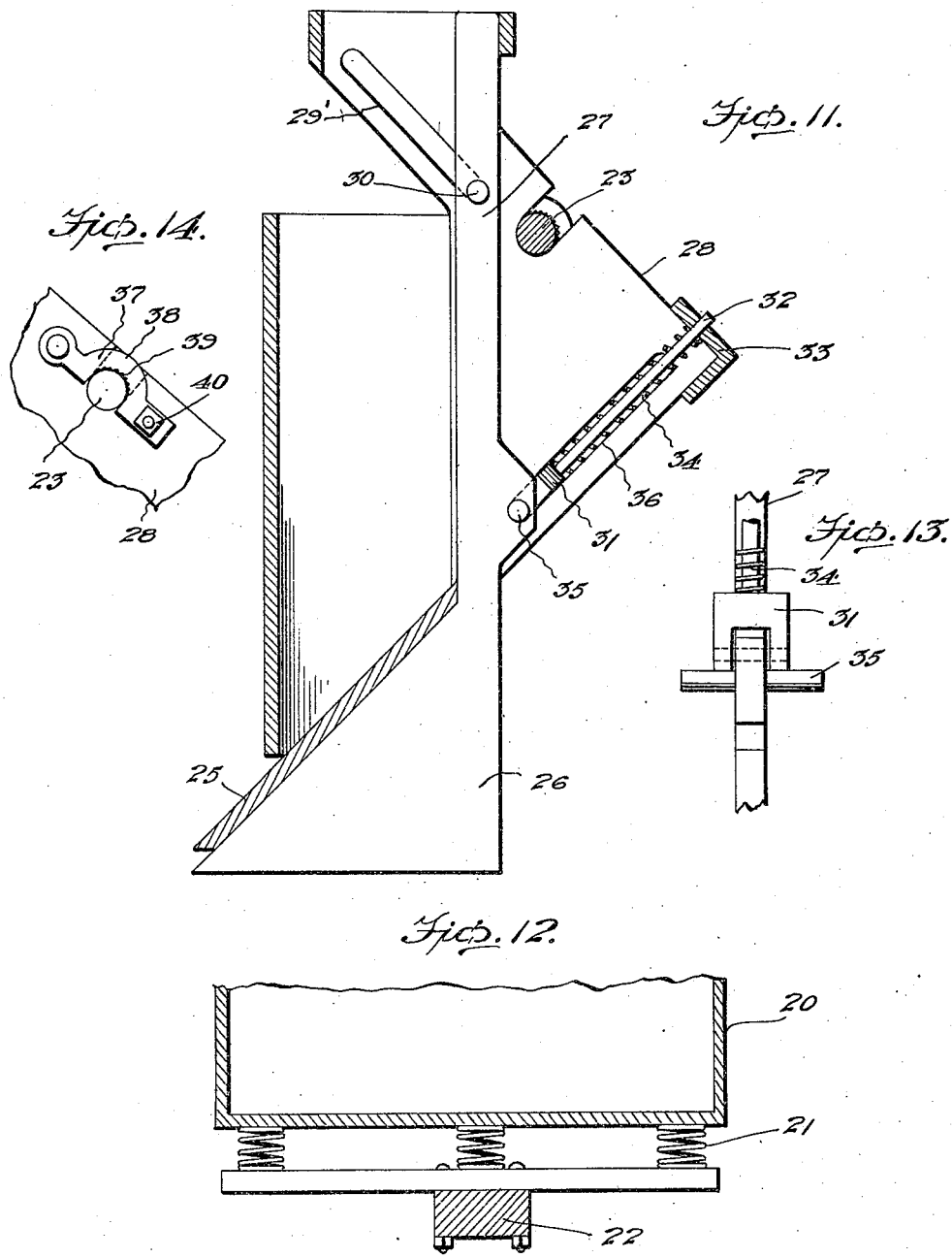

UNITED STATES PATENT OFFICE.

JOHN D. COCKE, OF RICHMOND, VIRGINIA.

SNOW-REMOVING MACHINE.

1,420,522.　　　　　　　Specification of Letters Patent.　　Patented June 20, 1922.

Application filed November 5, 1920. Serial No. 422,070.

*To all whom it may concern:*

Be it known that I, JOHN D. COCKE, residing at Richmond, in the county of Henrico and State of Virginia, have invented new and useful Improvements in Snow-Removing Machines, of which the following is a specification.

This invention relates to snow removing machines, and provides a mechanism which can be readily and easily mounted upon the chassis of a motor operated truck, subsequent to the removal of the body of the truck, the invention being such that the said truck may be converted into a snow removing machine when so desired.

The mechanism forming the subject matter of the invention embodies amongst other features a scoop or the like upon which the snow is gathered, and means for conveying the snow from said scoop into a receptacle from which it is dumped at the will of the operator, the said receptacle being mounted for tilting movement for this purpose.

The chief characteristic of the present invention resides in the construction of the scoop above referred to, the latter being made up of two sections mounted for lateral movement toward and away from each other, and equipped with means whereby the adjacent edges of the sections are normally maintained in over-lapped relation, the sections being so mounted to permit either or both of the sections to yield when brought in contact with obstacles in its path of movement, such as manhole covers, latch locks and the like, without injury to the machine and particularly the scoop.

In carrying out the invention use is made of a plurality of rotatably mounted buckets or the like for conveying the snow from the scoop to the above mentioned receptacle, the buckets being supported by a structure capable of being elevated in spaced relation to the ground or surface when their use is not desired, means for operating said buckets including a normally engaged clutch which automatically disengages incident to the raising of the said supporting structure of the buckets, so that the buckets remain at rest when in the position mentioned.

Another object of the invention resides in providing the machine with a plurality of plows arranged at the front for the purpose of plowing up the snow, ice and the like, and mounting the said plows in a manner whereby they yield when brought into engagement with obstacles in their path of movement, during which yielding movement the plows are elevated to pass over said obstacles without injury to the plows.

Other objects and advantages will appear as the following detail description is read in connection with the accompanying drawings, the invention residing in the combination, construction and arrangement of parts as claimed.

In the drawings forming part of this application like numerals of reference indicate the similar parts in the several views and wherein:—

Figure 1 is a side elevation of the machine constructed in accordance with the invention.

Figure 2 is a bottom plan view.

Figure 3 is a fragmentary top plan view of the buckets and the support structure therefor.

Figure 4 is a detail view of the locking means for the buckets.

Figure 5 is a sectional view taken on line 5—5 of Figure 2.

Figure 6 is a rear elevation showing the normal position of the receptacle by full lines and the dumping position by dotted lines.

Figure 7 is an enlarged side elevation of the clutch actuated element.

Figure 11 is an enlarged sectional view taken through one of the plows.

Figure 12 is a fragmentary sectional view of the receptacle and showing the cushioning means therefor.

Figure 13 is a detail view taken at right-angles to the Figure 11.

Figure 14 is a detail view showing the means for securing the plow to the supporting shaft.

Figure 8:
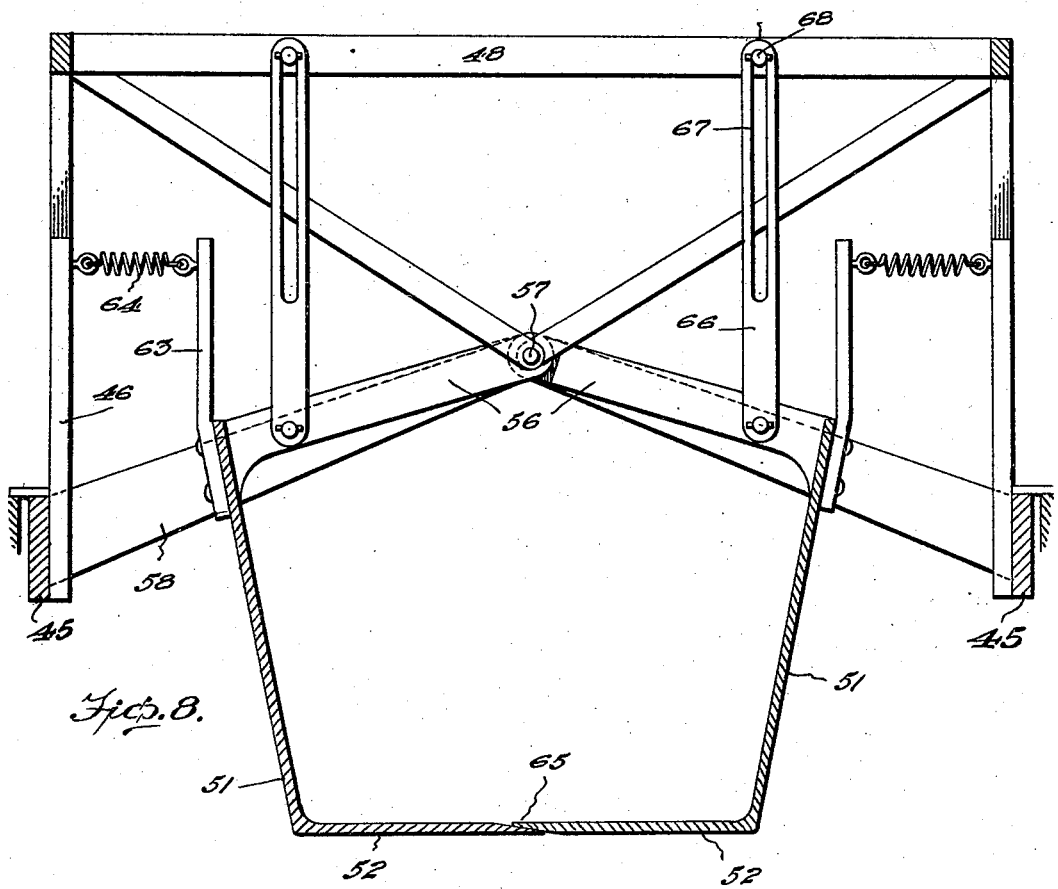
Figure 8 is a sectional view taken on line 8—8 of Figure 2.
Figure 9:
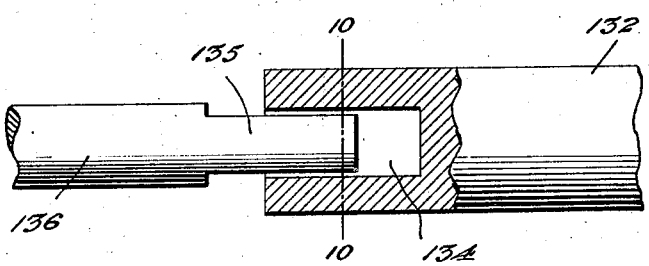
Figure 9 is a detail sectional view taken on line 9—9 of Figure 1.
Figure 10:
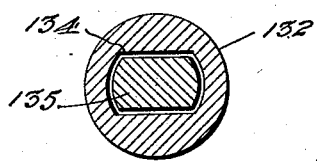
Figure 10 is a sectional view taken on line 10—10 of Figure 9.

Referring to the drawings in detail 10 indicates the chassis of a motor operated truck, the wheels being indicated at 11 and 12 respectively. The front wheels 11 are designed to provide a reasonably sharp periphery so that these wheels assists in cutting or plowing of the snow.

The mechanism forming the subject matter of my invention comprises a supporting structure mounted upon the rear end of the chassis 10, and which structure includes spaced parallel uprights 13 which are connected at their upper ends by cross pieces 14 and at points in their length by transverse reinforcing elements 15. This structure is further supported by bracing elements 16 arranged at opposite sides of said supporting structure and having their upper corresponding extremities secured as at 17 to the adjacent uprights 13, while the lower extremities of the bracing elements 16 are bolted or otherwise suitably secured as at 18 to the chassis 10. This structure as a unit is mounted upon the chassis and secured thereto in any suitable manner as at 19 so that the structure can be removed from the chassis when desired. Movably arranged between the uprights 13 of said supporting structure is a receptacle 20 which receives the snow gathered by the machine, and from which the snow is subsequently dumped in a manner to be hereinafter fully described, the receptacle 20 reposing upon cushioning elements 21 secured to the rear axle 22 of the machine.

Arranged at the front of the machine is a transversely disposed shaft 23 having mounted thereon a plurality of plows 25, the plow foot being indicated at 26 and including a shank 27. Each shank is arranged for sliding movement between the parallel members 28 of a frame carried by the shaft 23, the upper portion of which members 28 are provided with obliquely disposed slots 29' which receives a cross pin 30 carried by the shank 27. Pivotally associated with the shank adjacent its point of connection with the plow foot 26 is a yoke 31 carryig a stem 32 which slides through a bearing 33 forming part of the frame. Surrounding the stem 32 is a coiled spring 34, having one end bearing against the yoke 31 and its opposite end engaging the bearing 32. The spring 34 functions to normally maintain the plow 25 in active relation to the ground or surface, but allows the plow to yield when brought into contact with an obstruction, the plow moving upwardly over these circumstances against the tension of the spring 34, so that the plow can pass the obstruction without injury to itself. The shank 27 is equipped with a cross plate 35 which operates in parallel slots 36 in said frame, the pins 30 and 36 respectively guiding the plow in its movements. The plows are secured to the said shaft by means of pivoted locking elements 37 which form with intermediate bulging portions 38 having a serrated surface 39 to engage the shaft, the locking elements having their ends secured in any suitable manner as at 40. As above stated the shaft 23 is journaled in suitable bearing so that it may be rotated to elevate all of the plows simultaneously in spaced relation to the ground, the movement of the shaft for this purpose being controlled by a hand lever 41 arranged adjacent the driver's seat as shown in Figure 1. The lever 41 has one end connected to a rod 42, a side wall 51 and a section of the bottom 52. The side members 51 project an appreciable distance forward of the bottom of the scoop and constitute what may be properly termed runners 53. The bottom 52 is curved longitudinally, while the forward end of the bottom is cutting away to provide a flared opening or entrance 54. Projecting inwardly from each side member 51 of the scoop is an arm 56, the adjacent extremities of these arms being over-lapped and pivoted as at 57 upon a bracing element 58 which connects the parallel members 45 of the supporting structure. The bottom sections 52 at the rear thereof are pivoted as at 59 and each section adjacent its pivot carries a lug 60 with which one end of a spring 61 is connected, the opposite end of each spring being connected to a strip 62 projecting beyond the rear of the scoop from the adjacent side 51 thereof. Rising from each side 51 of the scoop adjacent the forward pivot 57 is a strip 63 to which a spring 64 is connected, the opposite end of which spring is connected to one of the uprights 46 of the supporting structure. It is manifest that the respective sections of the scoop are pivotally mounted to permit said sections to swing laterally away from each other when the forward end of the scoop comes in contact with an obstacle, such as a man-hole cover, a rock or the like which would injure the scoop, thereby permitting the machine to pass over said obstruction in an easy manner. When the sections of the scoop are swung laterally for this purpose upon their pivots 57 and 59 respectively their springs 61 and 64 are tensioned so that as soon as the scoop passes over said obstacle, the respective sections of the scoop are brought back to their normal positions, wherein the adjacent or meeting edges of the bottom sections 52 over-lap as at 65 clearly shown in Figure 8. The flared entrance passage to the scoop indicated at 54 allows the forward edges of the bottom sections to ride against the obstruction above mentioned without injuring the scoop, and in this manner the respective sections of the scoop are gradually separated for the purpose mentioned. Rising from each arm 56 is a slotted link 66 the slot 67 of which receives a pin 68 carried by the transverse member 48 of the supporting structure and in this manner are guided in their movements. Disposed in advance of the scoop but arranged within the supporting structure above described, are scrapers 69, the latter being divergently disposed and forming in reality a continuation of the side members 51 of the scoop. The scrapers are pivoted between the elements 58 and the end member 70 which connects the lower parallel member 45 of the supporting structure, the scrapers being pivotally mounted for movement to adjust tensions to meet all conditions and requirements, but being normally maintained in an upright position by means of the spring 71 and 72 respectively, these springs being arranged above and below an apertured lug 73 carried by each of the lower parallel members 45 of the supporting structure and centralling a curved rod 74. There is one of these rods for each scraper 69, and each rod has its lower end pivoted as at 75 to the adjacent scraper, while the rod slides through the aperture of the lug 73. Consequently, when the scraper 69 is moved upon its pivot in either direction, and brought into contact with an obstacle, or the curbstone should the machine be driven too close to the latter, one or the other of the springs 71 and 72 will yield in a manner to return the scraper to normal position at the proper time and to prevent injury to the scraper.

Journaled between the upper parallel members 44 of said supporting structure is a shaft 76 which carries the buckets 77. There are preferably two of these buckets, although any number may be used as found desirable, these buckets being pivoted as at 78 upon the parallel supporting elements 79 which radiate from the shaft 76 at opposite sides thereof. These supporting elements 79 pass through the shaft 76 and are braced by the respective members 80 of a parallelogram. For each bucket 77 there is a shaft 81 journaled in suitable bearing, and carried by said shaft and fixed thereto is a link 83 having one end pivoted as at 84 to a link 85 which is pivotally connected to the bottom of the bucket 77. Pivoted adjacent each bucket is a latch element 86 having a hook-like extremity 87 adapted to engage a keeper 88 secured to the bottom of the bucket to hold the latter immovable with regard to the supporting elements 79, while the bucket is moving in the direction of the scoop. A spring 89 has one end secured to one of the members, a said parallelogram 80, and its opposite end secured to the latch element 86 so that when the bucket has been emptied, and gravitates to its normal position with regard to the supporting elements 79, the latch element automatically engages the keeper 88 for the purpose stated. Carried by one end of each shaft 81 is an arm 90 which is brought into contact with a fixed cam 91 as the adjacent bucket is elevated, and as the cam 90 rides over the cam 91 it rotates the shaft 81. During the rotation of this shaft 81 the links 83 and 85 move the buckets upon its pivots to a dumping position, so that the contents of the bucket is deposited in the receptacle 20. However, just prior to the rotation of the shaft 81 in a manner described the latch element 86 contacts the trip 92, thereby moving the latch element 86 away from the keeper 88, thus releasing the buckets to be permitted to a dumping position as above set forth. The shaft 76 is equipped with a ratchet wheel 93, while projecting from the cam 91 is a spring pressed pawl 94, the spring 95 holding this pole in operative relation to the ratchet wheel 93 thereby preventing retrograde movement of the shaft 76.

The shaft 76 has loosely mounted thereon a clutch member 96, this member being equipped with a sprocket 97 over which is trained a handle chain 98, the latter being also trained over a sprocket 99 journaled on a diagonally disposed brace 100 which connects two of the uprights 13 forming part of the supporting structure for the receptacle 20. A second sprocket 101 is arranged in juxtaposition to the sprocket 97 and over this sprocket 101 is trained a handle chain 102, the latter being also trained over a sprocket 103 fixed upon the rear axle of the machine. 104 indicates the drive shaft which is equipped with a bevelled gear 105, the latter meshing with a similar gear 106 carried by the transversely disposed shaft 107 whereby the latter mentioned shaft is rotated from the drive shaft 104. This shaft 107 is equipped with a sprocket 108 over which is trained a chain 109, the latter being also trained over a sprocket 110 carried by the rear axle. The clutch member 96 is slidably mounted upon the shaft 76, the latter being designed to engage the clutch member 96, and normally held engaged therewith by means of a spring pressed clutch operating element 111. This element is mounted for vertical adjustment at one side of the machine and is connected as at 112 one branch of a bell crank lever the other branch 113 being connected to the yoke 114 of the clutch member 96. Springs 115 normally hold the clutch operating element in an elevated position and the clutch member 96 in engagement with the shaft 76.

In practice, as the machine moves over the surface, the snow is gathered upon the scoop, the shaft 76 being rotated from the rear axle of the machine as just described. The buckets 77 are normally fixed with relation to their supporting elements 79 by means of the latch elements 86, and remain in this position when approaching the scoop. The snow from the scoop is taken by each bucket as it passes through the scoop to a position above the receptacle 20, and when each bucket reaches a predetermined position the latch 86 contacts the trip 86′ releasing the bucket to permit it to assume a discharging position. The arm 90 at this time is moving over the cam 91, and just subsequent to the release of the bucket, the arm 90 is moved to rotate the shaft 81, thereby moving the bucket to a discharging position through the instrumentality of the links 83 and 85 respectively. After each bucket empties its contents into the receptacle 20, and moves to a position immediately above the shaft 76, it gravitates to its normal position to rest against the supporting element 79, and as it assumes this position the latch 86 through the instrumentality of the spring 87 automatically engages the keeper 88 to hold the bucket in a fixed position as it approaches the scoop. As here and above stated the supporting structure for the scoop and bucket is mounted for vertical movement with regard to the chassis 10, so that these parts may be elevated in spaced relation to the ground when their use is not desired. For this purpose, I make use of a transversely disposed shaft 116 each end of which is equipped with a bevelled gear 117, the latter mentioned with similar gears 118 carried by the parallel shafts 119 extending longitudinally of the machine. Secured to each of these shafts is a flexible element 120 adapted to be wound about and unwound from the shafts, the flexible elements being each trained over a guide pulley 121 journaled in a suitable bracket 122, and having its end connected in any suitable manner to the supporting structure to be lifted. A shaft 123 is mounted for rotation, and carried by this shaft is a gear 124 which meshes with a bevelled gear 125 secured to the transverse shaft 116. The shaft 123 may be rotated in any suitable manner. Manifestly, by rotating the shaft 123 in one direction, motion is imparted to the shaft 116 and the shafts 119 in a proper direction to wind the flexible element 120 about the latter mentioned shafts, thereby elevating the scoop, buckets and the supporting structure therefor in spaced relation to the ground. As this structure is elevated, the clutch operating element 111 is also elevated into the lower end wall of the slot 126 contacts the suitable pin 127 which projects through the slot thereby checking the upward movement of the clutch element 111. During the continued elevation of the said supporting structure, the bell crank lever which is connected to the clutch element 111 moves upon its fulcrum thereby disengaging the clutch from the shaft 76 so that the said shaft and buckets will not be rotated while the machine is in motion.

The receptacle 20 is pivoted as at 128 on a cross bar 129 which connects two of the uprights 13, this receptacle being so pivoted that it may be swung from its normal position illustrated by full lines in Figure 6 to its discharged position illustrated by dotted lines in the same figure. The opposite sides of the receptacle 20 have secured thereto corresponding terminals of flexible elements 130, these elements being extended upwardly and trained over guide pulleys 131 on the uprights 13. The flexible elements are then extended downwardly and are secured to a roller 132 which is journaled in suitable brackets 133 and adapted to be wound about and unwound from the roller to elevate and lower the receptacle 20. The roller 132 is provided with a bore 134 in one end thereof to slidably receive the reducing extremity 135 of a shaft 136, the latter extending longitudinally of the machine and arranged at one side thereof. This section 136 is journaled in suitable bearings 137 and has fixed thereon spaced gears 138 and 139 respectively. Operating between these gears and adapted to mesh with the latter is a gear 140, the latter being secured to one end of the transverse shaft 141. This shaft also carries a bevelled gear 142 which meshes with a similar gear 143 secured to a driven shaft 144. The shaft 141 continues rotation while the lever is in motion, while the shaft 136 slides through its bearing 137 and the bore 134 in the roller 132. Sliding movement of the shaft 136 is controlled by a lever 145 arranged within convenient reach of the driver, this lever being fulcrumed at 146 and suitably secured to the shaft 147. When the lever 145 is moved in one direction to bring the gear 139 into engagement with the gear 140, the shaft 136 is rotated in a direction to exerting a pull on the flexible elements 130 about the roller 132, and when thus pulled the receptacle 20 is elevated upon its pivot to assume its discharged position as shown by dotted lines in Figure 6. When the shaft 136 is moved in an opposite direction to bring the gear 138 into engagement with the gear 140, the shaft 136 is rotated in a reversed direction to exert a pull on the flexible elements 130 in an opposite direction and thus allow the receptacle 20 to gravitate to its normal position. One of the shafts 136 is provided with ball which is received by a socket 148, the latter forming part of the plow lever 149, so that when the lever is moved in one direction the socket 148 engages the bar carried by the end of the said shaft to prevent the rotation of the latter and thereby hold the receptacle 20 at any degree of elevation. In order to retard the return movement of the receptacle 20 to its normal position I provide a tension regulator for the elements 130, and this regulator consists of a lever 150 fulcrumed at a point between its ends as at 151. One end of the lever has secured thereto the adjacent extremity of a spring 152, the opposite end of which is secured to the receptacle as at 155. The other end of this lever 150 is connected to one end and of a flexible element 154, this element being trained over a guide pulley 155 and secured to the roller 132 to wind about and unwind therefrom. The flexible element 154 is connected with the roller 132 to wind about the latter when the flexible elements 130 are being unwound from the roller and in this manner the proper tension is maintained upon the respective cables so that the receptacle 20 is gradually returned to its normal position where it reposes upon the cushioning elements 21. Pivoted upon one of the uprights 12 is a trip 156, and one end of this trip is connected as at 157 to a link 158, the link being arranged parallel to the upright 13 and having its lower end connected to one branch of a bell crank lever as at 159. The latter mentioned lever is fulcrumed as at 160 and has its remaining branch connected to a rod 161 which extends parallel with the shaft 136 and connected with the control lever 145 as at 162. The trip 156 normally occupies a position in the path of movement of a pin 163 carried by the receptacle 20, so that when the said receptacle is moved to its discharged position illustrated by dotted lines in Figure 6, the pin 163 moves the trip 156 upon its pivot, imparting movement to the rod 161 in a proper direction to adjust the lever 145, and thus disengage the shaft 136 from the continuously rotating shaft 141.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A machine of the character described comprising a portable frame, a collecting container carried thereby, a receptacle mounted for pivotal movement, means for conveying the contents of the container into the receptacle, means for moving the receptacle upon its pivot to a dumping position, and including a driven shaft, a second shaft rotated from said means including a rotatable shaft, flexible elements secured to the receptacle and to said shaft and adapted to elevate and lower said receptacle incident to rotation of said shaft in opposite directions.

2. A machine of the class described comprising a portable frame, a collecting container carried thereby, a receptacle mounted for pivotal movement, means for conveying the contents of the container into said receptacle, a rotatable shaft, flexible elements connected with the receptacle, and adapted to be wound and unwound from said shaft to elevate and lower said receptacle, and manually controlled means for rotating said shaft in either direction for the purpose stated.

3. A machine of the class described comprising a portable frame, a collecting container carried thereby, a receptacle mounted for pivotal movement, means for conveying the contents of the container into the receptacle, a rotatable shaft, flexible elements connected to the receptacle and adapted to elevate and lower the receptacle, incident to rotation of said shaft in opposite directions, spaced gears carried by said shaft, a driven shaft including a gear, and means for shifting the first mentioned shaft to bring either of the gears thereof into mesh with the latter mentioned gear, whereby said shaft may be rotated in either direction for the purpose specified.

4. A machine of the character described comprising a portable frame, a shaft journaled at the forward end thereof, a plurality of plows yieldably mounted on said shaft, means for guiding said plows in its movements, means for rotating said shaft to elevate or lower said plows with relation to the surface, a collecting container, a receptacle, means for conveying the contents of the container into the receptacle and means for adjusting the receptacle to a dumping position.

5. A machine of the character described comprising a portable frame, a collecting container carried thereby, a receptacle mounted for pivotal movement, means for conveying the contents of the receptacle from the container into a receptacle, manually operated means including a clutch for controlling the movements of said receptacle upon its pivot, and receptacle operated means for releasing the clutch at a predetermined interval for the purpose specified.

6. A machine of the class described comprising a portable frame, a collecting container carried thereby, a receptacle mounted for pivotal movement, means for conveying the contents of the container into said receptacle, manually operated means including a clutch for elevating the receptacle upon its pivot to a dumping position, and means connecting with said clutch and operated by said receptacle to automatically release the clutch when the receptacle assumes its dumping position.

7. A machine of the class described comprising a portable frame, a rotatable shaft at the forward end thereof, a plurality of plows carried by the shaft and capable of independent yielding movement, means for rotating the shaft to a position with the plows with respect to the ground, a collecting container, a receptacle, means for conveying the contents of the container into the receptacle, said receptacle being mounted for pivotal movement, manually operated means including a clutch for moving the receptacle upon its pivot, and receptacle operated means for automatically disengaging the clutch when the receptacle assumes a predetermined position.

8. A machine of the class described comprising a portable frame, a collecting container carried thereby, a receptacle, a shaft journaled above the container, means for rotating said shaft, a plurality of buckets associated with said shaft for rotation therewith and adapted to convey the contents of the container into the receptacle, said buckets being pivotally mounted with relation to the shaft, and means for holding said buckets fixed relatively to the shaft as they pass through said container.

9. A machine of the class described comprising a portable frame, a collecting container carried thereby, a receptacle, a shaft journaled above the container, buckets associated with said shaft for rotation therewith and adapted to convey the contents of the container into the receptacle, said buckets being pivotally mounted with relation to the shaft, means for holding said buckets in a fixed position with relation to the shaft when passing through the container, and means for automatically releasing each bucket at a predetermined interval for the purpose specified.

10. A machine of the class described comprising a portable frame, a collecting container carried thereby, a receptacle, a shaft journaled above the container, a plurality of buckets mounted for rotation with the shaft and adapted to convey the contents of the container into the receptacle, said buckets being pivotally mounted with respect to said shaft, means for holding said buckets in a fixed position with relation to the shaft as they pass through the container, means for automatically releasing each bucket for pivotal movement at a predetermined interval, and said buckets subsequently gravitate to a position whereby they are automatically engaged by said means for holding them in fixed position with relation to the surface.

11. A machine of the class described comprising a portable frame, a collecting container carried thereby, a receptacle, a shaft journaled above the container, a plurality of buckets mounted for rotation with the shaft and for pivotal movement with relation thereto, means for holding said buckets in a fixed position with relation to the shaft as each bucket passes through the container, means for automatically releasing each bucket at a predetermined time, and means operating to move said buckets to a dumping position subsequent to their release.

12. A machine of the character described comprising a portable frame, a collecting container carried thereby, a receptacle, a shaft journaled above the container, a plurality of buckets mounted for rotation with the shaft and for pivotal movement with relation thereto, a spring pressed latch element for each bucket to hold the latter in a fixed position with relation to the shaft as it passes through the container, a trip disposed in the path of movement of each latch element to automatically release each bucket at a predetermined interval, and means to automatically move each bucket to a dumping position subsequent to its release.

13. A machine of the class described comprising a portable frame, a collecting container, a receptacle, a shaft journaled above the container, a plurality of buckets mounted for rotation with said shaft and for pivotal movement with relation thereto, means for holding each bucket in a fixed position with relation to the shaft as it passes through the container, means for automatically releasing each bucket, at a predetermined interval, a stationary cam, and means for moving each bucket upon its pivot to a dumping position subsequent to its release, and said means including an arm adapted to move over said cam for the purpose stated.

14. A machine of the character described comprising a portable frame, a collecting container carried thereby, a receptacle, a shaft journaled above the container, a plurality of buckets mounted for rotation with the shaft and for pivotal movement with relation thereto, means for holding each bucket in a fixed position with relation to the shaft as it passes through the container, means for releasing each bucket at predetermined interval, a fixed cam, a rotatable shaft, links pivotally connected together and connecting each bucket with said second mentioned shaft, and an arm carried by the latter mentioned shaft and adapted to ride over said cam to move each bucket to a dumping position subsequent to its release.

15. A machine of the character described comprising a wheeled frame, a collecting container carried thereby, a receptacle, a shaft journaled above the container, means carried by the shaft for conveying the contents of the container into said receptacle, means including a normally engaged clutch for rotating the shaft from one axle of the machine, means for adjusting the container in said shaft vertically, and means whereby said clutch is automatically disengaged when said parts are elevated.

16. A machine of the character described comprising a portable frame, a collecting container, a supporting structure therefor removably associated with said frame, a receptacle, means mounted on said supporting structure for conveying the contents of the container into the receptacle, and manually controlled means for elevating and holding said supporting structure in an elevated position.

17. A machine of the class described comprising wheeled frame, a collecting container, a supporting structure therefor movably mounted on said frame, a receptacle, means carried by said supporting structure and conveying the contents of the container into said receptacle, and including a rotatable shaft, cams for driving said shaft from one axle of the machine and including a normally engaged clutch, manually operated means for elevating and holding said supporting structure in an elevated position for the purpose specified, and means automatically disengaging said clutch when the said structure is elevated.

18. A machine of the class described comprising a portable frame, a collecting container mounted thereon, a receptacle, means for conveying the contents of the container into said receptacle, said container including sections mounted for lateral movement toward and away from each other for the purpose specified, and yieldable means for normally holding said sections associated to define said container.

19. A machine of the class described comprising a portable frame, a receptacle, a collecting container, means for conveying the contents of the container into said receptacle, said container being made up of identically constructed sections mounted for lateral movement toward and away from each other, each section including a side and bottom portion, and yieldable means for normally holding said sections associated to define the container, with the adjacent edges of the said bottom portions overlapped.

20. A machine of the class described comprising a portable frame, a collecting container, a receptacle, means for conveying the contents of the container into said receptacle, said container being made up of identically constructed sections pivotally mounted for lateral movement toward and away from each other, means for guiding said sections in their movements, and yieldable means for normally holding said sections in container forming positions.

21. A machine of the character described comprising a portable frame, a receptacle, a collecting container, means for conveying the contents of the container into said receptacle, said container including identically constructed sections mounted for lateral movement toward and away from each other, each section including a bottom portion and a side member, means for normally holding the sections associated to define the container, said bottom portions being cut away to provide a flared entrance opening, the said side members projecting beyond the forward end of the bottom and constituting runners, and yieldably mounted scrapers disposed in advance of the containers to provide a continuation of said runners as described.

In testimony whereof I affix my signature.

JOHN D. COCKE.